(12) United States Patent
Yu et al.

(10) Patent No.: US 9,948,652 B2
(45) Date of Patent: *Apr. 17, 2018

(54) SYSTEM FOR RESOURCE-CENTRIC THREAT MODELING AND IDENTIFYING CONTROLS FOR SECURING TECHNOLOGY RESOURCES

(71) Applicant: Bank of America Corporation, Charlotte, NC (US)

(72) Inventors: Sounil Yu, Reston, VA (US); Brandon Matthew Sloane, Santa Barbara, CA (US)

(73) Assignee: Bank of America Corporation, Charlotte, NC (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/156,024

(22) Filed: May 16, 2016

(65) Prior Publication Data

US 2017/0331849 A1 Nov. 16, 2017

(51) Int. Cl.
*H04L 29/06* (2006.01)
*G06F 21/62* (2013.01)

(52) U.S. Cl.
CPC .......... *H04L 63/10* (2013.01); *G06F 21/6209* (2013.01); *H04L 63/105* (2013.01); *H04L 63/14* (2013.01); *H04L 63/1433* (2013.01); *H04L 63/1441* (2013.01)

(58) Field of Classification Search
CPC ....... H04L 63/105; H04L 63/10; H04L 63/14; G06F 21/62; G06F 21/6209
See application file for complete search history.

(56) References Cited

U.S. PATENT DOCUMENTS

| 5,345,595 A | 9/1994 | Johnson et al. |
| 5,905,859 A | 5/1999 | Holloway et al. |
| 5,991,881 A | 11/1999 | Conklin et al. |
| 6,088,804 A | 7/2000 | Hill et al. |

(Continued)

OTHER PUBLICATIONS

The STRIDE Threat Model, retrieved from the internet on Sep. 6, 2016, https://msdn.microsoft.com/enus/library/ee823878(v=cs.20).aspx, 1 page.

(Continued)

*Primary Examiner* — Hadi Armouche
*Assistant Examiner* — Sher A Khan
(74) *Attorney, Agent, or Firm* — Michael A. Springs; Moore & Van Allen PLLC; Peter B. Stewart (57) ABSTRACT

Systems, computer program products, and methods are described herein for identifying threat vectors and implementing controls for securing resources within a network. The present invention is configured to determine one or more threat vectors associated with the resource; determine one or more controls associated with each of the one or more threat vectors associated with the resource; determine whether the one or more controls associated with the at least one of the one or more threat vectors is capable of detecting the access by an external computing device via at least one of the one or more types of access; and dynamically generate a graphical representation of the resource and the one or more threat vectors based on at least the received analysis request.

20 Claims, 4 Drawing Sheets

(56) References Cited

U.S. PATENT DOCUMENTS

| | | | |
|---|---|---|---|
| 6,119,236 A | 9/2000 | Shipley | |
| 6,279,113 B1 | 8/2001 | Vaidya | |
| 6,298,445 B1 | 10/2001 | Shostack et al. | |
| 6,301,668 B1 | 10/2001 | Gleichauf et al. | |
| 6,347,374 B1 | 2/2002 | Drake et al. | |
| 6,363,489 B1 | 3/2002 | Camay et al. | |
| 6,381,242 B1 | 4/2002 | Maher, III et al. | |
| 6,578,147 B1 | 6/2003 | Shanklin et al. | |
| 6,631,416 B2 | 10/2003 | Bendinelli et al. | |
| 6,704,874 B1 | 3/2004 | Porras et al. | |
| 6,735,701 B1 | 5/2004 | Jacobson | |
| 6,772,345 B1 | 8/2004 | Shetty | |
| 6,789,203 B1 | 9/2004 | Belissent | |
| 6,839,850 B1 | 1/2005 | Campbell et al. | |
| 6,910,135 B1 | 6/2005 | Grainger | |
| 6,957,067 B1 | 10/2005 | Iyer et al. | |
| 6,988,208 B2 | 1/2006 | Hrabik et al. | |
| 7,181,766 B2 | 2/2007 | Bendinelli et al. | |
| 7,225,188 B1 | 5/2007 | Gai et al. | |
| 7,493,659 B1 | 2/2009 | Wu et al. | |
| 7,506,155 B1 | 3/2009 | Stewart et al. | |
| 8,015,091 B1* | 9/2011 | Ellis | G06Q 40/00 705/35 |
| 8,595,176 B2 | 11/2013 | Wang et al. | |
| 8,914,406 B1 | 12/2014 | Haugsnes | |
| 9,509,712 B2 | 11/2016 | Pinney Wood et al. | |
| 9,516,041 B2 | 12/2016 | Baikalov et al. | |
| 9,516,054 B2 | 12/2016 | Malachi | |
| 9,531,738 B2 | 12/2016 | Zoldi et al. | |
| 9,537,879 B2 | 1/2017 | Blackwell | |
| 9,560,066 B2 | 1/2017 | Visbal | |
| 9,565,204 B2 | 2/2017 | Chesla | |
| 9,571,512 B2 | 2/2017 | Ray et al. | |
| 9,584,536 B2 | 2/2017 | Nantel | |
| 9,596,256 B1 | 3/2017 | Thomson et al. | |
| 2004/0006704 A1 | 1/2004 | Dahlstrom et al. | |
| 2004/0221176 A1* | 11/2004 | Cole | G06F 21/577 726/25 |
| 2005/0066195 A1 | 3/2005 | Jones | |
| 2005/0193430 A1 | 9/2005 | Cohen | |
| 2007/0180107 A1 | 8/2007 | Newton et al. | |
| 2007/0226796 A1 | 9/2007 | Gilbert et al. | |
| 2009/0024627 A1 | 1/2009 | King | |
| 2011/0138471 A1 | 6/2011 | Van de Weyer et al. | |
| 2011/0161848 A1 | 6/2011 | Purcell et al. | |
| 2011/0288692 A1 | 11/2011 | Scott | |
| 2013/0307682 A1 | 11/2013 | Jerhotova et al. | |
| 2014/0189098 A1* | 7/2014 | MaGill | H04L 63/1425 709/224 |
| 2014/0237594 A1* | 8/2014 | Thakadu | G06F 21/52 726/23 |
| 2014/0380484 A1* | 12/2014 | Choi | G06F 21/577 726/25 |
| 2015/0033337 A1* | 1/2015 | Baikalov | H04L 63/1408 726/23 |
| 2015/0033341 A1* | 1/2015 | Schmidtler | H04L 63/14 726/23 |
| 2016/0182559 A1* | 6/2016 | Francy | H04L 63/1441 726/1 |
| 2016/0359895 A1 | 12/2016 | Chiu et al. | |
| 2017/0013011 A1 | 1/2017 | Renouil et al. | |
| 2017/0063917 A1 | 3/2017 | Chesla | |
| 2017/0085588 A1 | 3/2017 | Laidlaw et al. | |

OTHER PUBLICATIONS

Wikipedia, the Free Encyclopedia, retrieved from the internet on Sep. 6, 2016, https://en.wikipedia.org/wiki/Factor_analysis_of_information_risk, 4 pages.

* cited by examiner

SYSTEM FOR RESOURCE-CENTRIC THREAT MODELING AND IDENTIFYING CONTROLS FOR SECURING TECHNOLOGY RESOURCES

BACKGROUND

With the growth in the Internet, securing technology resources has become an integral part of computer and information. Typically, securing technology resources includes measures adopted to avoid loss in the form of confidentiality, integrity, and availability of these resources. Breaches in technology resources typically result in these types of losses against customer and client information, payment information, personal files, account details, which can be detrimental to both the entity and the customer involved. Protecting against these breaches requires a comprehensive understanding of the various threat vectors that can lead to a breach.

BRIEF SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for identifying threat vectors and implementing controls for securing internal resources within a network is presented. The system comprises: at least one non-transitory storage device; at least one processor; and at least one module stored in said storage device and comprising instruction code that is executable by the at least one processor and configured to cause said at least one processor to: provide a threat vector analysis application for installation on a user device; electronically receive an analysis request associated with an internal resource from the user device, wherein receiving further comprises initiating the threat vector analysis application on the user device, whereby the initiating of the threat vector analysis application establishes a communicable link with a network associated with the internal resource; electronically receive, via a distributed network of servers, information associated with the internal resource within the network; determine one or more threat vectors associated with the internal resource, wherein the one or more threat vectors indicate one or more paths of access to the internal resource; determine one or more controls associated with each of the one or more threat vectors associated with the internal resource, wherein the one or more controls are configured to determine access to the internal resource; dynamically generate a graphical representation of the internal resource and the one or more threat vectors based on at least the received analysis request; and initiate, via the established communicable link, a presentation of a user interface for display on the user device, the user interface comprising the graphical representation of the internal resource and the one or more threat vectors associated with the internal resource.

In some embodiments, the module is further configured to cause the at least one processor to: determine that the one or more controls associated with at least one of the one or more threat vectors is not capable of detecting the access to the internal resource; determine one or more additional controls capable of detecting the access to the internal resource, wherein the one or more controls are stored in a controls library; initiate, via the established communicable link, a recommendation interface for display on the user device, the recommendation interface comprising the one or more additional controls recommended to the user for incorporation.

In some embodiments, the module is further configured to cause the at least one processor to: determine one or more access types associated with each of the one or more threat vectors, wherein the one or more access types indicate one or more ways in which the internal resource is capable of being accessed via each of the one or more threat vectors.

In some embodiments, the module is further configured to cause the at least one processor to: determine a frequency score associated with each of the one or more threat vectors, wherein the frequency score indicates a number of occurrence of a threat via each of the one or more threat vectors; determine a magnitude of impact score associated with each of the one or more threat vectors, wherein the magnitude of impact score indicates a consequence of a loss event caused via each of the one or more threat vectors; determine a strength associated with each of the one or more controls associated with each of the one or more threat vectors; determine an exposure score associated with each of the one or more threat vectors based on at least the frequency score, the magnitude of impact score, and the strength associated with each of the one or more controls associated with each of the one or more threat vectors.

In some embodiments, the one or more controls are configured to be regulated to monitor access to the internal resource via at least one of the one or more threat vectors, thereby reducing the exposure score associated with each of the one or more threat vectors.

In some embodiments, wherein the module is further configured to cause the at least one processor to: determine that the exposure score associated with at least one of the one or more threat vectors is greater than a predetermined threshold; determine one or more additional controls capable of detecting the access to the internal resource, wherein the one or more controls are stored in a controls library; initiate, via the established communicable link, a recommendation interface for display on the user device, the recommendation interface comprising the one or more additional controls recommended to the user for incorporation; electronically receive, via the established communication link, a user selection of at least one of the one or more additional controls recommended to the user; and incorporate the one or more additional controls selected by the user, wherein the incorporating the one or more additional controls lowers the exposure score to below the predetermined threshold.

In some embodiments, the module is further configured to cause the at least one processor to: determine one or more additional controls; determine a cost associated with the incorporation of each of the one or more additional controls; determine that the cost associated with the incorporation of each of the one or more additional controls is lower than the difference between the exposure score associated with the at least one of the one or more threat vectors before implementation of the one or more additional controls and after the implementation of the one or more additional controls; based on determining that the cost associated with the incorporation of each of the one or more additional controls is lower than the difference between the exposure score associated with the at least one of the one or more threat vectors before implementation of the one or more additional controls and after the implementation of the one or more additional controls, initiate, via the established communicable link, a recommendation interface for display on the user device, the recommendation interface comprising the one or more additional controls; electronically receive, via the established communication link, a user selection of at least one of the one or more additional controls; and incorporate the one or more additional controls selected by the user.

In some embodiments, the module is further configured to cause the at least one processor to: determine one or more additional controls; determine a cost associated with the incorporation of each of the one or more additional controls; determine that the cost associated with the incorporation of each of the one or more additional controls is lower than the difference between the exposure score associated with the at least one of the one or more threat vectors before implementation of the one or more additional controls and after the implementation of the one or more additional controls; and based on determining that the cost associated with the incorporation of each of the one or more additional controls is lower than the difference between the exposure score associated with the at least one of the one or more threat vectors before implementation of the one or more additional controls and after the implementation of the one or more additional controls, automatically incorporate the one or more additional controls.

In another aspect, a computerized method for identifying threat vectors and implementing controls for securing internal resources within a network is presented. The method comprises providing, using a computing device processor, a threat vector analysis application for installation on a user device; electronically receiving, using a computing device processor, an analysis request associated with an internal resource from the user device, wherein receiving further comprises initiating the threat vector analysis application on the user device, whereby the initiating of the threat vector analysis application establishes a communicable link with a network associated with the internal resource; electronically receiving, via a distributed network of servers, information associated with the internal resource within the network; determining, using a computing device processor, one or more threat vectors associated with the internal resource, wherein the one or more threat vectors indicate one or more paths of access to the internal resource; determining, using a computing device processor, one or more controls associated with each of the one or more threat vectors associated with the internal resource, wherein the one or more controls are configured to determine access to the internal resource; determining, using a computing device processor, whether the one or more controls associated with the at least one of the one or more threat vectors is capable of detecting the access by an unauthorized external resource; dynamically generating, using a computing device processor, a graphical representation of the internal resource and the one or more threat vectors based on at least the received analysis request; and initiating, via the established communicable link, a presentation of a user interface for display on the user device, the user interface comprising the graphical representation of the internal resource and the one or more threat vectors associated with the internal resource.

In yet another aspect, a computer program product for identifying threat vectors and implementing controls for securing internal resources within a network is presented. The computer program product comprising a non-transitory computer-readable medium comprising code causing a first apparatus to: provide a threat vector analysis application for installation on a user device; electronically receive an analysis request associated with an internal resource from the user device, wherein receiving further comprises initiating the threat vector analysis application on the user device, whereby the initiating of the threat vector analysis application establishes a communicable link with a network associated with the internal resource; electronically receive, via a distributed network of servers, information associated with the internal resource within the network; determine one or more threat vectors associated with the internal resource, wherein the one or more threat vectors indicate one or more paths of access to the internal resource; determine one or more controls associated with each of the one or more threat vectors associated with the internal resource, wherein the one or more controls are configured to determine access to the internal resource; determine whether the one or more controls associated with the at least one of the one or more threat vectors is capable of detecting the access by an unauthorized external resource; dynamically generate a graphical representation of the internal resource and the one or more threat vectors based on at least the received analysis request; and initiate, via the established communicable link, a presentation of a user interface for display on the user device, the user interface comprising the graphical representation of the internal resource and the one or more threat vectors associated with the internal resource.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. For clarity, non-essential elements may have been omitted from some of the drawing.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be standalone programs, may be incorporated as sub-routines in an operating system, may be functions in an installed software package, and the like.

Threat modeling is a systematic approach to identifying all possible threat vectors to ensure that technology resources are adequately protected against those vectors. Most threat modeling tools focus on a software-centric approach, requiring intimate knowledge of a software system in order to properly create a threat model. However, these software-centric threat modeling tools are impractical in many cases because the owners of the resource do not have intimate knowledge of the software system and lack the ability to change the internal design or code of the software to properly secure it against various threat vectors that they discover. Regardless of these limitations, resource owners still need to create a threat model to understand their potential exposures and find compensating controls to mitigate against any damage.

The present invention embraces an asset centric model (e.g., resource centric model) of threat factors that may compromise technology resources as well as controls that may be used to protect such resources. The present invention provides the functional benefit of identifying different threat vectors, i.e. different ways that a technology resource may be compromised, identifying controls that have been implemented to protect against particular threat vectors, and evaluating the magnitude of harm and potential frequency of attacks that may be caused along each threat vector against the strength of implemented controls to determine potential impact along each threat vector. In some embodiments, this information may be provided to the user in a graphical form including recommendations for implementing additional controls. Also, the system may consult a control library to identify controls that may be implemented to protect a particular technology resource along a particular threat vector. Overall, if the cost of implementing a control is less than the impact reduced by implementing the control, then the system may provide a recommendation to implement the control.

With a focus on finding compensating controls, this invention provides a resource-centric threat modeling system that allows resource owners to create a threat model while requiring only basic familiarity of the resource's functions and interactions with other resources. In addition, this invention enables resource owners to match the strength of controls against the frequency of attack and the magnitude of impact from the identified threat vectors to ensure that the controls can sufficiently mitigate the impact in accordance with the resource owner's level of risk tolerance.

Securing technology resources includes policies adopted to prevent and monitor unauthorized access, misuse, modification, or denial of a computer network and network-accessible resources. In other words, securing technology resources involves the authorization of access to a resource (e.g. hardware, software, data, people, or the like) in a network, measured by a network administrator. Users choose or are assigned an ID and password or other authenticating information that allows them access to resources within their authority. Technology resources (e.g., computer hardware or software) require security within a variety of computer networks, both public and private, that are used in everyday jobs; conducting transactions and communications among businesses, government agencies and individuals. Networks can be private, such as within a company, and others which might be open to public access.

In some embodiments, an "entity" as used herein may refer to an organization comprising multiple individuals such as an institution or an association that has a collective goal and external environment. Typically, organizations have a management structure that determines relationships between different activities and the members, and subdivides and assigns roles, responsibilities, and authority to carry out different tasks. For purposes of the invention, technology resources may include one or more hardware and/or software resources available to a user and which allow the user to work towards the collective goal of the entity. In some embodiments, a user may be considered a resource.

Securing technology resources includes protecting resources from both passive and active intrusions. Typically, a passive intrusion is a network intrusion in which a system is monitored and sometimes scanned for open ports and vulnerabilities. The intrusion is considered "passive" when a network intruder intercepts network traffic within a network. In this regard, passive attacks include traffic analysis, monitoring of unprotected communications, decrypting weekly encrypted traffic, and capturing authentication information such as passwords. Active intrusions on the other hand are aimed to disrupt the operation of the network itself allowing the intruder to bypass or break into secure systems. In this regard, active intrusions attempt to circumvent or break protection features, introduce malicious code, and to steal or modify information. These intrusions are mounted against a network backbone, exploit information in transit, electronically penetrate an enclave, or attempt to establish unauthorized communication links with the enclave. An entity's network may be vulnerable to network intrusions due to a variety of reasons including but not limited to, non-existent security architecture, un-patched client-side software and applications, phishing or targeted attacks, Internet websites, for configuration management, use of mobile devices such as laptops or handheld devices capable of connecting to the network remotely, cloud computing, removable media, or the like.

Figure 1:
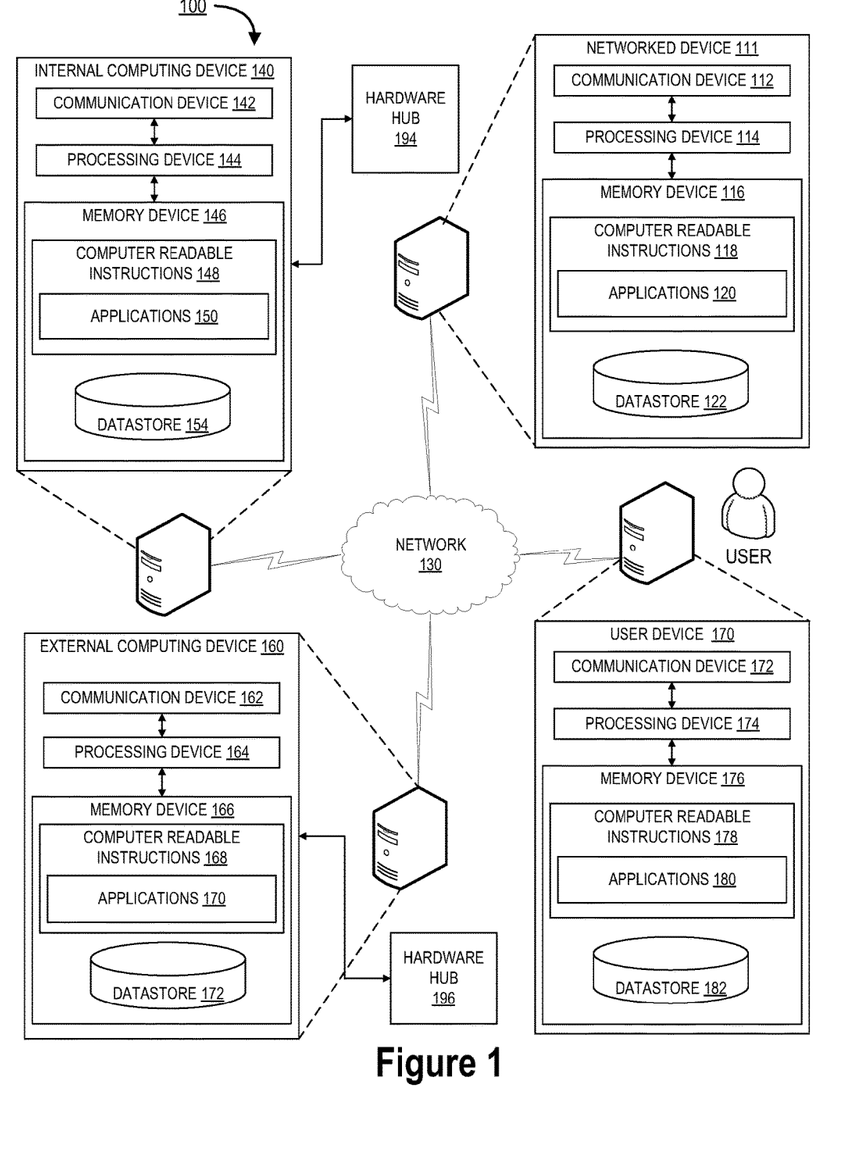
FIG. 1 illustrates a system environment for securing technology resources, in accordance with some embodiments of the invention.

FIG. 1 illustrates a system environment 100 for securing technology resources, in accordance with some embodiments of the invention. The environment 100 includes a networked device 111, an external computing device 160, an internal computing device 140, and a user device 170. For purposes of the invention, the computing devices used herein (e.g., internal computing device, external computing device, network device, or the like) are exemplary resources within the entity's network. The systems and devices communicate with one another over the network 130 and perform one or more of the various steps and/or methods according to embodiments of the disclosure discussed herein. The network 130 may include a local area network (LAN), a wide area network (WAN), and/or a global area network (GAN). The network 130 may provide for wireline, wireless, or a combination of wireline and wireless communication between devices in the network. In one embodiment, the network 130 includes the Internet.

The networked device 111, the external computing device 160, the internal computing device 140, and the user device 170 each includes a computer system, server, multiple computer systems and/or servers or the like. The internal computing device 140, in the embodiments shown, has a communication device 142 communicably coupled with a processing device 144, which is also communicably coupled with a memory device 146. The processing device 144 is configured to control the communication device 142 such that the internal computing device 140 communicates across the network 130 with one or more other systems. The processing device 144 is also configured to access the memory device 146 in order to read the computer readable instructions 148, which in some embodiments includes a one or more applications 150 stored thereon. The memory device 146 also includes a datastore 154 or database for storing pieces of data that can be accessed by the processing device 144. In some embodiments, the datastore 154 houses sensitive data such as customer and client information, payment information, personal files, account details, or the like that requires protection. In some embodiments, the internal computing device 140 includes a hardware hub 194 configured to facilitate the connection of multiple devices or connections to be connected to the internal computing device 140. For example, a hardware hub may be a USB (Universal Serial Bus) hub which allows multiple USB devices to be connected to one computer, even though the computer may only have a few USB connections. In doing so, the hardware hub 194 enables the transfer of data from the internal computing device 140 to a device connected via the hardware hub 194. In one aspect, the hardware hub 194 may be an Ethernet hub, and active hub, a network hub, repeater hub, or any such hubs capable of connecting multiple inter-networked devices together and making them act as a single network segment.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 114, 144, 164, or 174 may further include functionality to operate one or more software programs based on computer-executable program code thereof, which may be stored in a memory. As the phrase is used herein, a processing device 114, 144, 164, or 174 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device includes any computer memory that provides an actual or virtual space to temporarily or permanently store data and/or commands provided to the processing device 114, 144, 164, or 174 when it carries out its functions described herein. In some embodiments, any data and/or information may be stored in non-volatile memory distinct from instructions for executing one or more process steps discussed herein that may be stored in a volatile memory such as a memory directly connected or directly in communication with a processing device executing the instructions. In this regard, some or all the process steps carried out by the processing device may be executed in near-real-time, thereby increasing the efficiency by which the processing device may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices.

The networked device 111 may typically be referred to devices similar to the internal computing device 140 located within the cyberspace associated with the entity and networked to communicate with one or more other networked devices. The networked device 111 includes a communication device 112 operatively coupled with a processing device 114, which is also communicably coupled with a memory device 116. The processing device 114 is configured to control the communication device 112 such that the networked device 111 communicates across the network 130 with one or more other systems. The processing device 114 is also configured to access the memory device 116 in order to read the computer readable instructions 118, which in some embodiments includes an application 120. The memory device 116 also includes a datastore 122 or database for storing pieces of data that can be accessed by the processing device 114. In some embodiments, the networked device 111 may be a mobile device of the user, a back end system associated with the entity, a third party device, or another device capable of accessing the network.

The external computing device 160 includes a communication device 162 operatively coupled with a processing device 164, which is also communicably coupled with a memory device 166. The processing device 164 is configured to control the communication device 162 such that the external computing device 160 communicates across the network 130 with one or more other systems. The processing device 164 is also configured to access the memory device 166 in order to read the computer readable instructions 168, which in some embodiments includes an application 170. The memory device 166 also includes a datastore 172 or database for storing pieces of data that can be accessed by the processing device 264. In some embodiments, the external computing device 160 includes a hardware hub 196 configured to facilitate the connection of multiple devices or connections to be connected to the external computing device 160. In this regard, the hardware hub 196 may be connected in such a way that facilitates data transfer not only from the data store 172 associated with the external computing device 160, but also from data stores associated with one or more computing devices (e.g. networked device 111, internal computing device 140, or the like) and/or networked devices connected via the network 130.

In some embodiments, the system environment may include one or more other network devices (not shown) may include one or more other computing devices or physical devices required for communication and interaction between the devices on the network 130 to mediate data within the network 130. For example, a networked device may include, but is not limited to computing devices such as a personal computer, shared devices such as a printer, scanner, copier, or the like, networking hardware such as gateways, routers, bridges, modems, or the like, and/or one or more hardware hubs.

The user device 170 may include any computerized apparatus that can be configured to perform any one or more of the functions of the user device 170 described and/or contemplated herein. For example, a user may use the user device 170 to transmit and/or receive information or commands to and from the internal computing device 140, external computing device 160, networked device 111, and/or one or more other networked devices via the network 130. The user device 170 may be a mobile device or other non-mobile computing device. The user may be a person who uses the user device 170 to execute a user application 180. The user application 180 may be an application to communicate with the internal computing device 140, external computing device 160, networked device 111, and/or one or more other networked devices via the network 130, perform a transaction, input information onto a user interface presented on the user device 170, or the like. In this regard, the internal computing device 140, external computing device 160, networked device 111, and/or one or more other networked devices may be configured to establish a communication link with the user device 170, whereby the communication link establishes a data channel (wired or wireless) to facilitate the transfer of data between the user device 170 and the internal computing device 140, external computing device 160, networked device 111, and/or one or more other networked devices. In doing so, one or more aspects of the user device 170 may be accessed, such as, a GPS (Global Positioning System) device, an image capturing component (e.g., camera), a microphone, a speaker, or the like. In some embodiments, for example, the user device 170 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user device 170 includes a communication device 172, a processing device 174, and a memory device 176. In such embodiments, the communication device 172 is operatively and selectively connected to the processing device 174. The processing device 174 is also configured to access the memory device 176 in order to read the computer readable instructions 178, which in some embodiments includes a user application 180. In some embodiments, the user may use the user application 180 to execute portions of the processes described with respect to the process flows described herein.

In some embodiments, the applications 120, and 150 may be any software program, or group of programs, that is designed for the end-user. In some embodiments, the applications 120 and 150 may be network software applications designed to help set up, manage, and/or monitor the network 130. In some other embodiments, the applications 120 and 150 may be software programs stored on the networked device 111 and the external computing device 160 respectively and capable of being configured to access the internal computing device 140. In this regard, the applications 120 and 150 may be configured to retrieve data from the one or more data stores associated with one or more computing devices on the network 130.

In some embodiments, the applications 120, 150, 170, and/or 180 may include a program, or a group of programs or tools configured to control and/or prohibit unauthorized access of the internal computing device 140 by one or more computing devices associated with the network 130, such as the external computing device 160, the network device 111, and/or other networked devices. In one aspect, the unauthorized access may refer to unauthorized access to the communication device 142, the processing device 144, the memory device 146, one or more applications 150 stored on the internal computing device 140, and/or the data store 154. Typically, unauthorized access may include viewing private accounts, messages, files or resources without prior permission from the owner/user/administrator of the internal computing device 140 to do so. Examples of unauthorized access may include but is not limited to sniffing/wiretapping/eavesdropping on network traffic, exploiting security weaknesses by using vulnerability assessment tools to probe network systems, Internet protocol (IP) spoofing, obstructing computer services by placing malicious programs either within the computing device, or in one or more data paths associated with the computing device, placing the back door that enables intruders to come back to the system at a later date, installing malicious programs such as viruses to edit, modify, and/or delete data stored on the computing device, insert an undetectable program into an authorized application to retrieve sensitive information, and/or the like.

In some embodiments, the application 150 associated with the internal computing device 140 may be configured for instructing the processing device 144 to perform various steps of the methods discussed herein, and/or other steps and/or similar steps. In various embodiments, one or more of the applications 120, 150, 170, and 180 are included in the computer readable instructions stored in a memory device of one or more systems or devices other than the systems 160 and 140 and the networked device 111. For example, in some embodiments, the application 120 is stored and configured for being accessed by a processing device of one or more networked devices connected to the network 130. In various embodiments, the applications 120, 150, 170, and 180 stored and executed by different systems/devices are different. In some embodiments, the applications 120, 150, 170, and 180 stored and executed by different systems may be similar and may be configured to communicate with one another, and in some embodiments, the applications 120, 150, 170, and 180 may be considered to be working together as a singular application despite being stored and executed on different systems.

In various embodiments, one of the systems discussed above, such as the internal computing device 140, is more than one system and the various components of the system are not collocated, and in various embodiments, there are multiple components performing the functions indicated herein as a single device. For example, in one embodiment, multiple processing devices perform the functions of the processing device 144 of the internal computing device 140 described herein.

In various embodiments, the internal computing device 140, the external computing device 160, and the networked device 111 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Figure 2:
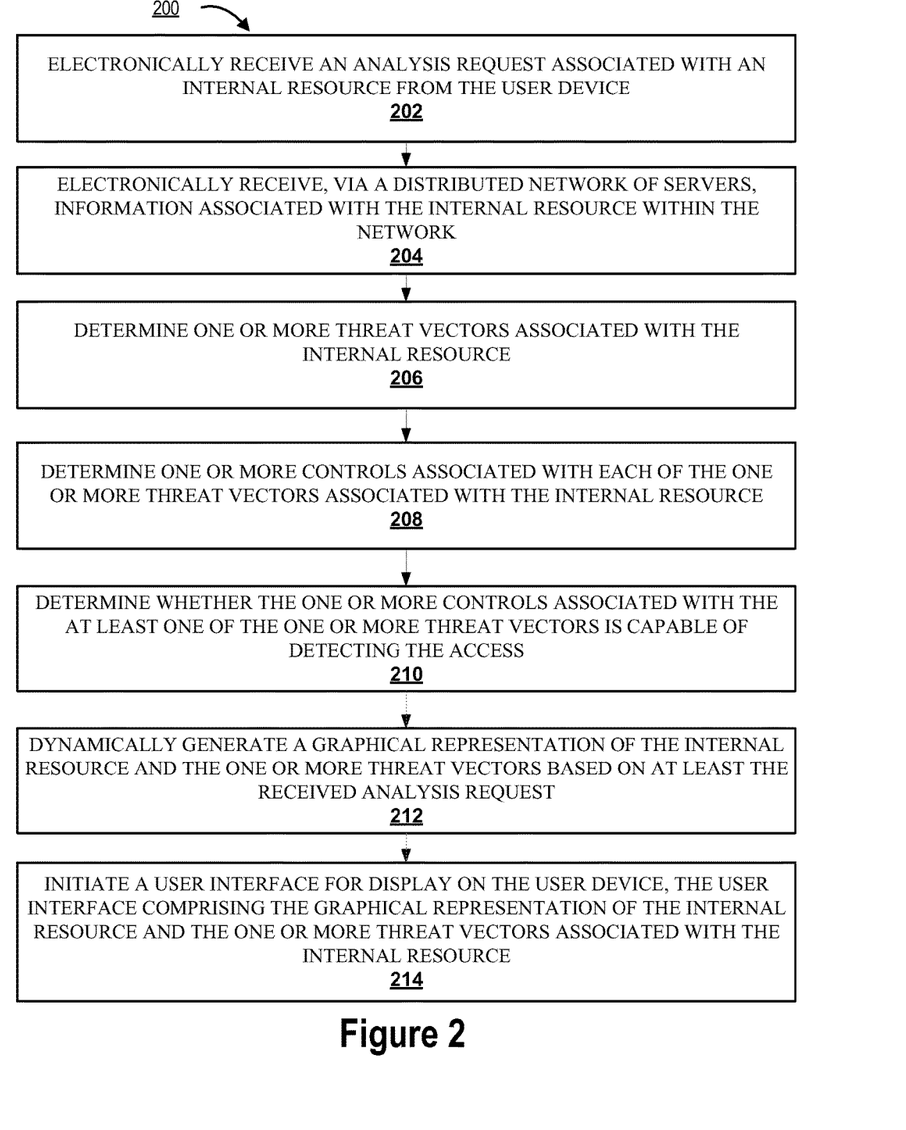
FIG. 2 illustrates a process flow for identifying threat vectors and implementing controls for securing technology resources, in accordance with some embodiments of the invention.

FIG. 2 illustrates a process flow 200 for identifying threat vectors and implementing controls for securing technology resources, in accordance with some embodiments of the invention. As shown in block 202, the process flow includes electronically receiving an analysis request associated with an internal resource from the user device. In this regard, the system may be configured to provide a threat vector analysis application for installation on a user device. Typically, the system may electronically receive an analysis request associated with an internal resource from the user device. In this regard, receiving the analysis request further includes initiating the threat vector analysis application on the user device whereby the initiation of the threat vector analysis application establishes a communicable link with the network associated with the internal resource.

Next, as shown in block 204, the process flow includes electronically receiving, via a distributed network of servers, information associated with the internal resource within the network. As described herein, a resource may refer to devices, data, networks, and any other resources functioning within the entity's network. In some embodiments, the information associated with the internal resource may include but is not limited to one or more software applications stored on the internal resource, one or more ports located thereon, one or more data repositories associated with the internal resource, one or more networks associated with the internal resource, one or more peripheral devices connected to the internal resource, one or more data paths to and from the internal resource, one or more network devices connected to one or more networks associated with the internal resource, one or more tools associated with the internal resource, and/or the like. This information may be received from a distributed network of servers connected directly or indirectly to the internal resource, thereby providing complete information associated with at least one or more data paths to and from the internal resource.

Next, as shown in block 206, the process flow includes determining one or more threat vectors associated with the internal resource. To do so, the system may determine a working knowledge of threats to organize a security strategy to prepare for responses to the threats. In some embodiments, a threat vector indicates one or more ways (or access paths) through which the internal resource may be accessed (or in some cases, compromised). In this regard, the internal resource may be compromised if the internal resource is capable of being accessed by an unauthorized external resource. In some embodiments, the external resource may refer to any resource (e.g., device) directly or indirectly connected to the internal resource attempting to gain access to the internal resource. An internal resource may be considered compromised if the access to the internal resource is unauthorized. In another aspect, the access to the internal resource may not be unauthorized access. As described herein, the one or more threat vectors specify one or more paths that can be chosen by the external resource to retrieve data from an internal resource.

In one aspect, threat vectors within particular categories of threat types can be identified. For example, the STRIDE methodology may be used to identify and categorize various threat (vector) types. More specifically, STRIDE is an acronym for: (i) Spoofing—Spoofing refers to an act of attempting to gain access to a system by using a false identity. This can be accomplished using misappropriated user credentials or a false IP address. After successfully gaining access as a legitimate user or host, elevation of privileges or abuse using authorization can begin; (ii) Tampering—Tampering is the unauthorized modification of data, for example as it flows over a network between two computers; (iii) Repudiation—Repudiation is the ability of users (legitimate or otherwise) to deny that they performed specific actions or transactions; (iv) Information disclosure—Information disclosure is the unwanted exposure of private data, for example, a user views the contents of a table or file he or she is not authorized to open, or monitors data passed in plaintext over a network. Some examples of information disclosure vulnerabilities include the use of hidden form fields, comments embedded in Web pages that contain database connection strings and connection details, and weak exception handling that can lead to internal system level details being revealed to the client; (v) Denial of service—Denial of service is the process of making a system or application unavailable. For example, a denial of service attack might be accomplished by bombarding a server with requests to consume all available system resources or by passing it malformed input data that can crash an application process; and (vi) Elevation of privilege—Elevation of privilege occurs when a user with limited privileges assumes the identity of a privileged user to gain privileged access to an application. For example, a user with limited privileges might elevate his or her privilege level to compromise and take control of a highly privileged and trusted process or account.

Next, as shown in block 208, the process flow includes determining one or more controls associated with each of the one or more threat vectors associated with the internal resource. In one aspect, the one or more controls may be configured to determine access to the internal resource. As described herein, the one or more controls may be regulated to identify, detect, monitor, regulate, or determine access authorization, thereby distinguishing the abilities of administrators from users. In some embodiments, the one or more controls may be configured to regulate network traffic associated with the internal resource to detect and prohibit unauthorized access to the internal resource. In some other examples, the one or more controls may be configured to regulate access to a remote resource to detect and prohibit unauthorized access to the remote resource. For example, a control may be requesting authentication credentials from a user to access a particular resource (internal or otherwise). In some embodiments, the system may be configured to utilize one or more tools to regulate the controls to monitor access to the internal resource. For example, a tool may be a software installed in the resource that implements the control. In this regard, the tool may be configured to receive the credentials and validate them to determine access to the resource. In one aspect, the one or more tools may be both software tools and/or hardware tools, and that, the one or more tools are used to prevent, detect, and remove unauthorized access to the internal computing device.

In some embodiments, the system may be configured to determine one or more different types of access that may be made via one or more of the access paths by the external resource to access the internal resource. The one or more access types may include one or more ways in which an external resource may access the internal resource via the one or more access paths. For example, an internal resource may be accessed via an email application (access path) capable of facilitating the transfer of data from the internal resource to one or more devices (external resources) connected to the network (e.g., Internet, LAN, WAN, or the like). An external resource attempting to access the internal resource in this case may be in the form malware to either disrupt computer operations, gather sensitive information, gain access to private computer systems, or display unwanted advertising. The one or more access types in this case may specify one or more ways the malware may gain unauthorized access to the internal resource, including, but is not limited to, email text, attachments, hyperlinks in the subject line/body of the email, or the like.

Next, as shown in block 210, the process flow includes determining whether the one or more controls associated with the at least one of the one or more threat vectors is capable of detecting the access by an unauthorized external resource via at least one of the one or more types of access. Continuing with the previous example, the system may be configured to determine whether the one or more controls associated with the email application access path is capable of detecting the access (and in some cases) via the different access types, specifically, email text, attachments, hyperlinks in the subject line/body of the email, or the like.

Next, as shown in block 212, the process flow includes dynamically generating a graphical representation of the internal resource and the one or more threat vectors based on at least the received analysis request. In this regard, the graphical representation of the internal resource and the one or more threat vectors may be configured to automatically adapt to the type of user device used by the user (e.g., cell phones, PDAs, touch panels, or the like) for ubiquitous access to software applications, device controllers, and Internet services.

Next, as shown in block 214, the process flow includes initiating, via the established communicable link, a presentation of a user interface for display on the user device, the user interface comprising the graphical representation of the internal resource and the one or more threat vectors associated with the internal resource. In some embodiments, the system may be configured to generate a graphical representation of the internal resource and the one or more threat vectors by meeting the user device's constraints and minimizing the estimated effort for the user's expected interface actions.

In some embodiments, the system may be configured to determine one or more tools configured to regulate the one or more controls to monitor the accessing of the internal resource. In response, the system may then incorporate the one or more tools within the network to regulate the one or more controls to detect and monitor the accessing of the internal resource by the external resource via at least one of the one or more types of access.

Figure 3:
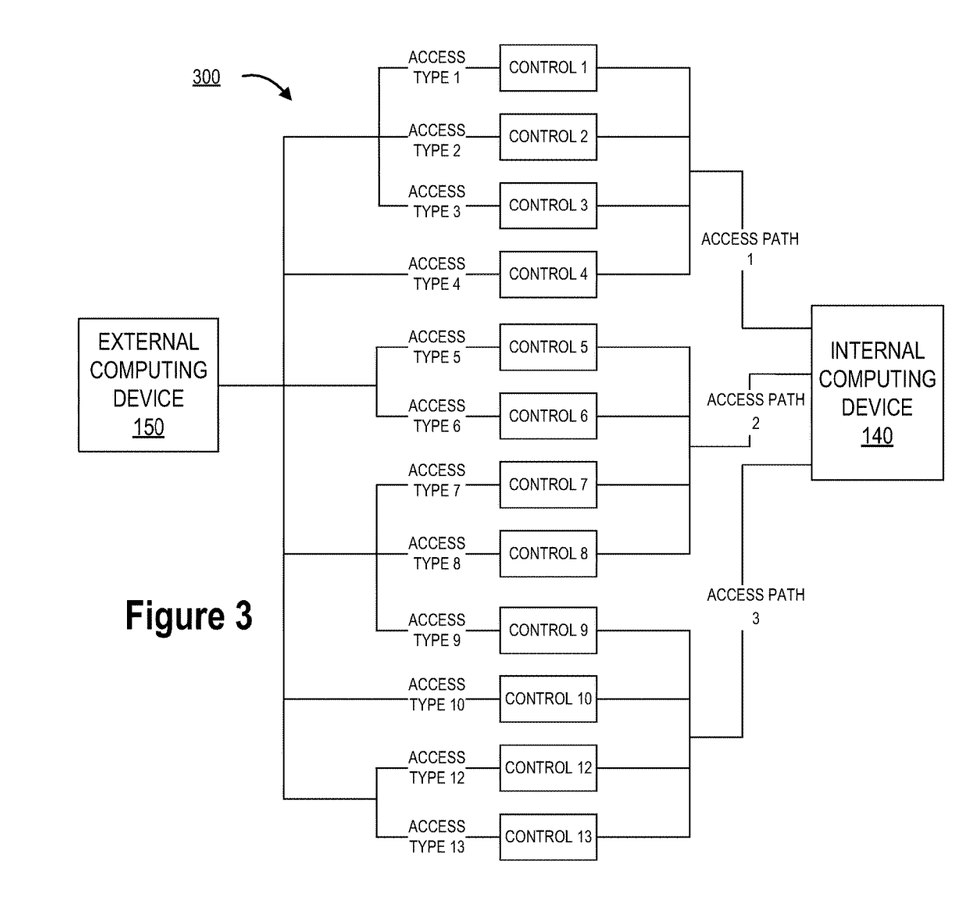
FIG. 3 illustrates a data environment illustrating an exemplary graphical representation of the internal resource and the one or more threat vectors, in accordance with an embodiment of the invention.

FIG. 3 illustrates a data environment 300 illustrating an exemplary graphical representation of the internal resource and the one or more threat vectors, in accordance with an embodiment of the invention. For purposes of the invention, the resources that require protection within a networking environment are described in terms of data stored within the network and/or the internal computing device 140. As used herein, "data" may refer to both logical data and physical data. The logical aspect of data is what the data means. The physical aspect of data is the medium in which the data is stored. Typically, logical data has a structure that is used to represent its meaning and some form of classification. Since logical data cannot exist except in some physical form, the relationship between logical data and physical data is a "using" relationship.

As shown in FIG. 3, the data environment 300 includes one or more threat vectors (access path 1, access path 2, and access path 3) specifying one or more paths that can be chosen by an external computing device (or any device connected to the network 130) to retrieve data from an internal computing device 140. In some embodiments, each threat vector involves authorization to access one or more data repositories associated with the internal computing device 140. In some other embodiments, each threat vector involves authorization to access one or more applications stored on the internal computing device 140. For example, administrators may have the ability to remove, edit and add data, while general users may not even have "read" rights if they lack access to particular information. As shown in FIG. 2, the data environment 300 includes a threat vector (access path 4) via a hardware hub associated with the internal computing device 140.

In some embodiments, the data environment 300 includes one or more controls associated with each threat vector. Typically, in the field of information security, a control is safeguard or countermeasure to avoid, detect, counteract, or minimize security exposure. The one or more controls may be regulated to determine access authorization and distinguish the abilities of administrators and users. For example, administrators may have the ability to remove, edit and add data, while general users may not even have "read" rights if they lack access to particular information. In other words, the one or more controls may be regulated to identify, protect, detect (a threat to), respond (to a threat to), or recover the data.

In some embodiments, the one or more threat vectors may include one or more access types. The one or more access types may include one or more ways in which an external computing device 160 may access the internal computing device 140 via the one or more threat vectors. In one aspect, each access type may be associated with a control to regulate access to the internal computing device 140 via a threat vector. In another aspect, one or more access types may be associated with a control to regulate access to the internal computing device 140 via a threat vector. In yet another aspect, each access type may be associated with one or more controls to regulate access to the internal computing device 140 via a threat vector.

In some embodiments, the data environment 300 may include one or more tools (not shown) to regulate the controls to monitor access to the internal computing device. The one or more tools may be both software tools and/or hardware tools, and that, the one or more tools are used to prevent, detect, and remove unauthorized access to the internal computing device 140. In this regard, the tools may be computer software used to protect the internal computing device 140 from malicious browser helper objects, browser hackers, keyloggers, rootkits, fraudtools, or the like, or security devices such as biometric computer security devices (iris detector, fingerprint scanner, gait analysis, or the like), port security device (e.g., USB security device), or the like. In one aspect, the tools may include one or more capabilities to facilitate the regulation of the controls to detect and prohibit access to the internal computing device 140 via the one or more threat vectors. Typically, a capability may be defined as an aptitude or competency that an entity may possess or require at an entity, business function, or individual level that has the potential, or is required to contribute to a business outcome thereby creating value. For example, the control is a type of capability that has a control objective. In some embodiments, the system may be configured to assign a tool to each access type thereby regulating a control associated with a threat vector. In some other embodiments, the system may be configured to assign a tool to one or more access types thereby regulating one or more controls associated with a threat vector. In one aspect, the system may be configured to assign a tool capable of regulating one or more controls associated with multiple threat vectors simultaneously. Similarly, the data environment 200 may include a tool capable of regulating a control to determine access to the hardware hub 194 associated with the internal computing device 140.

In some embodiments, the data environment 300 may be presented for display on the user device as part of a graphical user interface (e.g., as described above with respect to blocks 212 and 214). In one aspect, the graphical user interface may include one or more categories associated with each of the one or more controls. For example, the controls may be categorized based on the STRIDE methodology described above. In some other embodiments, the graphical user interface may also include an exposure score associated with each of the threat vectors. In this regard, the system may determine a frequency score associated with each of the one or more threat vectors indicating a number of occurrences of a threat (causing the loss event) via each of the one or more threat vectors. In addition, the system may also determine a magnitude of impact score associated with each of the one or more threat vectors indicating an effect of the threat on the internal resource. In some embodiments, the graphical user interface may include a recommendation interface including a recommendation for one or more additional controls for implementation. In some embodiments, the system may be configured to determine an objective associated with the internal resource. In one aspect, the objective may be an indication of what the threat (e.g., a hacker) may want to do/or obtain from the internal resource. In this regard, the system may determine one or more objectives for each of the one or more threat vectors and determine what effect the threat might have to the internal resource, when the internal resource is accessed via a particular threat vector. In some embodiments, the graphical user interface may include the one or more objectives associated with the internal resource.

Figure 4:
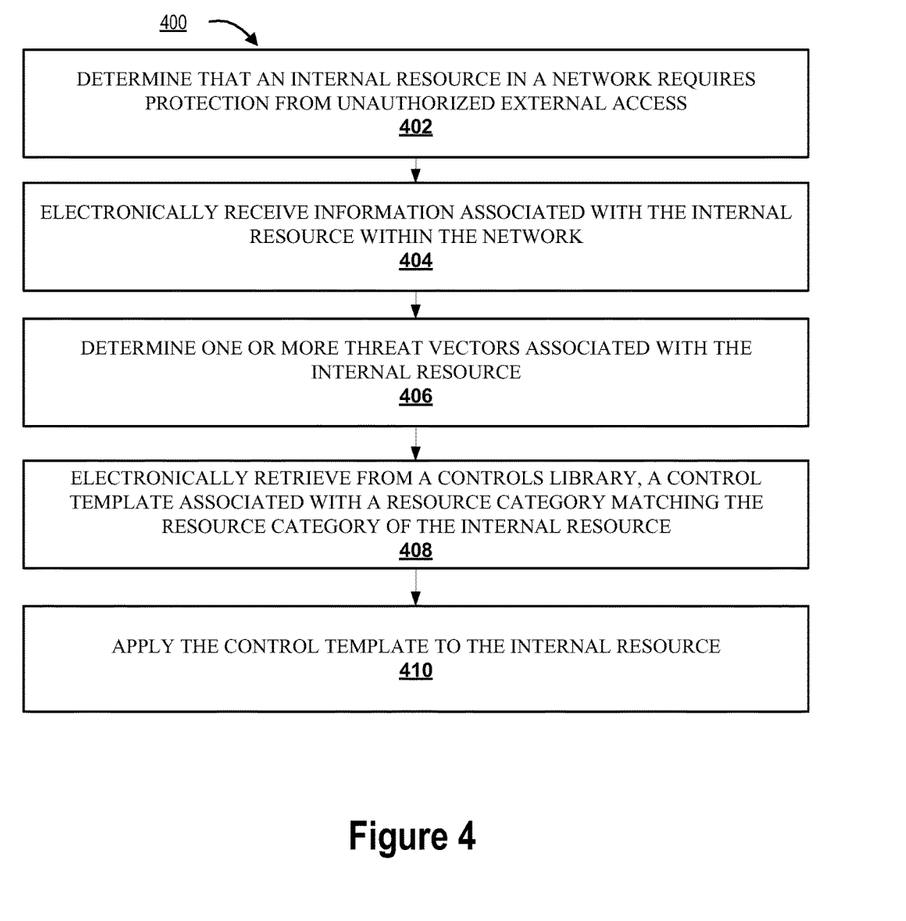
FIG. 4 illustrates a process flow for generation and implementation of threat vector templates and implementing controls for securing technology, in accordance with an embodiment of the invention.

FIG. 4 illustrates a process flow 400 for generation and implementation of threat vector templates and implementing controls for securing technology, in accordance with an embodiment of the invention. As shown in block 402, the process flow includes determining that an internal resource in a network requires protection from unauthorized external access. In this regard, the internal resource may be an existing resource within the network with inadequate security measures requiring protection from unauthorized external access. In one aspect, the system may be configured to determine that the one or more controls associated with at least one of the one or more threat vectors is not capable of detecting the access to the internal resource. For example, the system may determine that while an antivirus software stored on the internal computing device may scan text and hyperlinks in the subject line/body of the email, the antivirus software does not scan attachments. In some embodiments, the system may be configured to determine one or more additional controls capable of detecting the access to the internal resource. In response, the system may be configured to initiate a recommendation interface for display on the user device, the recommendation interface comprising the one or more additional controls recommended to the user for incorporation. In some other embodiments, the internal resource may be a new resource to be added to the network.

As shown in block 404, the process flow includes electronically receiving information associated with the internal resource within the network, wherein the information associated with the internal resource comprises at least a resource category. Typically, the resource category is used to broadly classify the internal resource. The categories may be based on at least a type of resource such as a smart device, display device, gaming device, mobile device, security device, or the like, resource accessibility indicating different levels of possible access to the resource (e.g., administrator level, user level, guest level, or the like), resource functionality, resource sensitivity, inherent resource controls, or the like.

As shown in block 406, the process flow includes determining one or more threat vectors associated with the internal resource. As discussed above, the one or more threat vectors indicate one or more paths of access to the internal resource. Once the threat vectors have been identified, the process flow then includes electronically receiving from a controls library, a control template associated with a resource category matching the resource category of the internal resource, as shown in block 408. In some embodiments, the control template includes a map of one or more controls to be applied to each of the one or more threat vectors associated with the internal resource. As described herein, the one or more controls are configured to determine access to the internal resource. In this regard, the one or more controls are configured to be regulated to monitor access to the internal resource via at least one of the one or more threat vectors. In some embodiments, the additional controls and the control templates are stored in a controls library. The controls library includes information associated with each control, overviews that describe the control and how to use it, programming elements used with each control, and predetermined control template for each resource category.

Next, as shown in block 410, the process flow includes applying the control template to the internal resource. In some embodiments, the control template may be applied to the internal resource automatically. In this regard, the system may be configured to determine a resource category associated with the internal resource, retrieve the control template from the controls library, and automatically implement the one or more controls according to the retrieved template. In some other embodiments, the system may be configured to present the retrieved control template to the user. The user may then review the control template and authorize the system to implement the controls template such that the one or more controls associated with the control template is applied to the internal resource. In doing so the one or more controls associated with the at least one of the one or more threat vectors is capable of detecting the access to the internal resource via at least one of the one or more types of access.

In some embodiments, the access to the internal computing device by the external computing device via at least one of the one or more types of access causes a loss event. Typically, an event is a single occurrence within the network environment, usually involving an attempted change of state. An event usually includes the notion of time, the occurrence, and any details that explicitly pertains to the event or the network environment that may help explain or understand the events causes or effects. Specifically, a loss event is an event that reduces the value of resource or that creates a liability. In some embodiments, the system may be configured to analyze the possible impact of potential loss event based on Factor Analysis of Information Risk (FAIR) methodology. In one aspect, the FAIR methodology builds a foundation for developing a scientific approach to information exposure management and provides a model for understanding, analyzing, and quantifying exposure. The FAIR methodology is described in more in U.S. Patent Application Publication No. 2005/0066195, which is hereby incorporated by reference in its entirety. In this regard, the system may determine a magnitude of impact score (e.g., by employing the FAIR methodology). Furthermore, the system may determine a frequency score associated with each of the one or more threat vectors indicating a number of occurrences of a threat (causing the loss event) via each of the one or more threat vectors. In addition, the system may also determine an exposure score associated with each of the one or more threat vectors based on at least the frequency score and the magnitude of impact score. In combination, the system may determine an exposure score associated with the loss event based on both the probability score and the magnitude of impact score (e.g., based on the FAIR methodology). In some embodiments, the system may be configured to determine a strength of each of the one or more controls while determining the exposure score. In this regard, the strength of the control and the magnitude of impact score (and in some cases, the frequency score) is negatively correlated. For example, a hacker attempting to access an internal resource via a threat vector with high strength controls may not be as successful in causing a loss event as often and as impactful as intended compared to attempting access to the internal resource via a threat vector with low strength controls. Accordingly, the magnitude of impact and frequency of threats along a threat vector may be reduced by the strength of any corresponding control in determining an exposure score. By determining the exposure score for each of the one or more threat vectors, the system determines an impact of the threat in various predetermined categories. In some embodiments, the various categories that may be affected by include but is not limited to, regulatory impact, reputational impact, client impact, and financial impact. By identifying proper controls and configuring the identified controls to be regulated to monitor access to the internal resource via at least one of the one or more threat vectors, the present invention provides the functional benefit of detecting and monitoring access to the internal resource via the one or more threat vectors, thereby reducing the exposure score associated with each of the one or more threat vectors. In some embodiments, the system may be configured to determine one or more tools to assist in reducing either the frequency score or the magnitude of impact score thereby contributing to the reduction of the exposure score.

In some embodiments, the system may be configured to determine that the exposure score associated with at least one of the one or more threat vectors is greater than a predetermined threshold. In this regard, the predetermined threshold may be used to indicate when an event becomes a threat event, and rises to the level of a loss event. Typically, a threat event is an event that can, but does not necessarily cause loss to materialize. The system may then determine one or more additional controls capable of detecting the access to the internal resource. In response, the system may be configured to initiate, via the established communicable link, a recommendation interface for display on the user device, the recommendation interface comprising the one or more additional controls recommended to the user for incorporation. The user may then view the recommended additional controls and provide, via the recommendation interface, a selection of one or more additional controls from the recommended controls for incorporation. This information is transmitted to the system, via the established communication link. In response, the system may then incorporate the one or more additional controls selected by the user, wherein the incorporating the one or more additional controls lowers the exposure score to below the predetermined threshold. As either the frequency score or the magnitude of impact score is mitigated using the one or more additional controls, a certain level of exposure may be deemed acceptable. The exposure gap is the exposure that is yet to be mitigated because it is beyond the bounds of what can be accepted.

In some embodiments, the system may determine a cost associated with the incorporation of each of the one or more additional controls selected by the user and/or the one or more controls recommended to the user. Typical costs involved in the implementation of the one or more additional controls and/or the one or more controls recommended to the user include, but are not limited to, software license fees, maintenance fees, hardware involved, and/or implementation services. Also, the system may be configured to determine whether the cost associated with the incorporation of each of the one or more additional controls selected by the user and/or the one or more controls recommended to the user is lower than the difference between the exposure score associated with the at least one of the one or more threat vectors before implementation of the one or more additional controls selected by the user and/or the one or more controls recommended to the user and after the implementation of the one or more additional controls selected by the user and/or the one or more controls recommended to the user. If the cost associated with the incorporation of each of the one or more additional controls selected by the user and/or the one or more controls recommended to the user is lower than the difference between the exposure score associated with the at least one of the one or more threat vectors before implementation of the one or more additional controls selected by the user and/or the one or more controls recommended to the user and after the implementation of the one or more additional controls selected by the user and/or the one or more controls recommended to the user, the system may incorporate the one or more additional controls selected by the user and/or the one or more controls recommended to the user. In some embodiments, the system may be configured to determine a cost associated with the incorporation of the one or more controls prior to recommending the one or more controls to the user. In doing so, the system may be configured to determine whether the cost associated with the incorporation of the one or more controls is lower than the difference between the exposure score associated with the at least one of the one or more threat vectors before implementation of the one or more controls and after the implementation of the one or more controls. Based on this, the system may determine whether to recommend the one or more controls to the user (e.g., if the cost of implementing a control is less than the amount of exposure that would be reduced by implementing the control, then the system would typically recommend that such control be implemented, but if the cost of implementing a control is greater than the amount of exposure that would be reduced by implementing the control, then the system would typically not recommend implementing such control).

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for identifying threat vectors and implementing controls for securing internal technology resources within a network, the system comprising:
   at least one non-transitory storage device;
   at least one processor; and
   instruction code stored in said storage device, said instruction code being executable by the at least one processor and configured to cause said at least one processor to:
   provide a threat vector analysis application for installation on a user device associated with a user;
   electronically receive an analysis request associated with an internal resource from the user device, wherein receiving further comprises initiating the threat vector analysis application on the user device, whereby the initiating of the threat vector analysis application establishes a communicable link with a network associated with the internal resource;
   electronically receive, via a distributed network of servers, information associated with the internal resource within the network;
   determine one or more threat vectors associated with the internal resource, wherein the one or more threat vectors indicate one or more paths of access to the internal resource;
   determine one or more controls associated with each of the one or more threat vectors associated with the internal resource, wherein the one or more controls are configured to determine access to the internal resource;

dynamically generate a graphical representation of the internal resource and the one or more threat vectors based on at least the received analysis request; and initiate, via the established communicable link, a presentation of a user interface for display on the user device, the user interface comprising the graphical representation of the internal resource and the one or more threat vectors associated with the internal resource;

determine a frequency score associated with each of the one or more threat vectors, wherein the frequency score indicates a number of occurrence of a threat via each of the one or more threat vectors;

determine a magnitude of impact score associated with each of the one or more threat vectors, wherein the magnitude of impact score indicates a consequence of a loss event caused via each of the one or more threat vectors;

determine a strength associated with each of the one or more controls associated with each of the one or more threat vectors;

determine an exposure score associated with each of the one or more threat vectors based on at least the frequency score, the magnitude of impact score, and the strength associated with each of the one or more controls associated with each of the one or more threat vectors;

determine one or more additional controls;

determine a cost associated with the incorporation of each of the one or more additional controls;

determine that the cost associated with the incorporation of each of the one or more additional controls is lower than a difference between the exposure score associated with the at least one of the one or more threat vectors before implementation of the one or more additional controls and after the implementation of the one or more additional controls; and based on determining that the cost associated with the incorporation of each of the one or more additional controls is lower than a difference between the exposure score associated with the at least one of the one or more threat vectors before implementation of the one or more additional controls and after the implementation of the one or more additional controls, incorporate the one or more additional controls.

2. The system of claim 1, wherein the instruction code is further configured to cause the at least one processor to:

determine that the one or more controls associated with at least one of the one or more threat vectors is not capable of detecting the access to the internal resource;

determine one or more additional controls configured for detecting the access to the internal resource, wherein the one or more controls are stored in a controls library;

initiate, via the established communicable link, a recommendation interface for display on the user device, the recommendation interface comprising the one or more additional controls recommended to the user for incorporation.

3. The system of claim 1, wherein the instruction code is further configured to cause the at least one processor to:

determine one or more access types associated with each of the one or more threat vectors, wherein the one or more access types indicate one or more ways in which the internal resource is capable of being accessed via each of the one or more threat vectors.

4. The system of claim 1, wherein the one or more controls are configured to be regulated to monitor access to the internal resource via at least one of the one or more threat vectors, reducing the exposure score associated with each of the one or more threat vectors.

5. The system of claim 1, wherein the instruction code is further configured to cause the at least one processor to:

determine that the exposure score associated with at least one of the one or more threat vectors is greater than a predetermined threshold;

initiate, via the established communicable link, a recommendation interface for display on the user device, the recommendation interface comprising the one or more additional controls recommended to the user for incorporation; and electronically receive, via the established communication link, a user selection of at least one of the one or more additional controls recommended to the user;

wherein incorporating the one or more additional controls lowers the exposure score to below the predetermined threshold.

6. The system of claim 1, wherein the instruction code is further configured to cause the at least one processor to:

based on determining that the cost associated with the incorporation of each of the one or more additional controls is lower than a difference between the exposure score associated with the at least one of the one or more threat vectors before implementation of the one or more additional controls and after the implementation of the one or more additional controls, initiate, via the established communicable link, a recommendation interface for display on the user device, the recommendation interface comprising the one or more additional controls; and electronically receive, via the established communication link, a user selection of at least one of the one or more additional controls;

wherein the one or more additional controls are incorporated in response to receiving the user selection.

7. The system of claim 1, wherein:

the one or more additional controls are automatically incorporated in response to determining that the cost associated with the incorporation of each of the one or more additional controls is lower than a difference between the exposure score associated with the at least one of the one or more threat vectors before implementation of the one or more additional controls and after the implementation of the one or more additional controls.

8. A computerized method for identifying threat vectors and implementing controls for securing internal technology resources within a network, the method comprising:

providing, using a computing device processor, a threat vector analysis application for installation on a user device associated with a user;

electronically receiving, using a computing device processor, an analysis request associated with an internal resource from the user device, wherein receiving further comprises initiating the threat vector analysis application on the user device, whereby the initiating of the threat vector analysis application establishes a communicable link with a network associated with the internal resource;

electronically receiving, via a distributed network of servers, information associated with the internal resource within the network;

determining, using a computing device processor, one or more threat vectors associated with the internal resource, wherein the one or more threat vectors indicate one or more paths of access to the internal resource;

determining, using a computing device processor, one or more controls associated with each of the one or more threat vectors associated with the internal resource, wherein the one or more controls are configured to determine access to the internal resource;

dynamically generating, using a computing device processor, a graphical representation of the internal resource and the one or more threat vectors based on at least the received analysis request;

initiating, via the established communicable link, a presentation of a user interface for display on the user device, the user interface comprising the graphical representation of the internal resource and the one or more threat vectors associated with the internal resource;

determining, using a computing device processor, a frequency score associated with each of the one or more threat vectors, wherein the frequency score indicates a number of occurrence of a threat via each of the one or more threat vectors;

determining, using a computing device processor, a magnitude of impact score associated with each of the one or more threat vectors, wherein the magnitude of impact score indicates a consequence of a loss event caused via each of the one or more threat vectors;

determining, using a computing device processor, a strength associated with each of the one or more controls associated with each of the one or more threat vectors; and determining, using a computing device processor, an exposure score associated with each of the one or more threat vectors based on at least the frequency score, the magnitude of impact score, and the strength associated with each of the one or more controls associated with each of the one or more threat vectors;

determining, using a computing device processor, one or more additional controls;

determining, using a computing device processor, a cost associated with the incorporation of each of the one or more additional controls;

determining, using a computing device processor, that the cost associated with the incorporation of each of the one or more additional controls is lower than a difference between the exposure score associated with the at least one of the one or more threat vectors before implementation of the one or more additional controls and after the implementation of the one or more additional controls; and based on determining that the cost associated with the incorporation of each of the one or more additional controls is lower than a difference between the exposure score associated with the at least one of the one or more threat vectors before implementation of the one or more additional controls and after the implementation of the one or more additional controls, incorporating, using a computing device processor, the one or more additional controls.

9. The method of claim 8, wherein the method further comprises:

determining that the one or more controls associated with at least one of the one or more threat vectors is not capable of detecting the access to the internal resource;

determining one or more additional controls configured for detecting the access to the internal resource, wherein the one or more controls are stored in a controls library;

initiating, via the established communicable link, a recommendation interface for display on the user device, the recommendation interface comprising the one or more additional controls recommended to the user for incorporation.

10. The method of claim 8, wherein the method further comprises determining one or more access types associated with each of the one or more threat vectors, wherein the one or more access types indicate one or more ways in which the internal resource is capable of being accessed via each of the one or more threat vectors.

11. The method of claim 8, wherein the one or more controls are configured to be regulated to monitor access to the internal resource via at least one of the one or more threat vectors, thereby reducing the exposure score associated with each of the one or more threat vectors.

12. The method of claim 8, wherein the method further comprises:

determining that the exposure score associated with at least one of the one or more threat vectors is greater than a predetermined threshold;

initiating, via the established communicable link, a recommendation interface for display on the user device, the recommendation interface comprising the one or more additional controls recommended to the user for incorporation; and electronically receiving, via the established communication link, a user selection of at least one of the one or more additional controls recommended to the user;

wherein incorporating the one or more additional controls lowers the exposure score to below the predetermined threshold.

13. The method of claim 8, wherein the method further comprises:

based on determining that the cost associated with the incorporation of each of the one or more additional controls is lower than a difference between the exposure score associated with the at least one of the one or more threat vectors before implementation of the one or more additional controls and after the implementation of the one or more additional controls, initiating, via the established communicable link, a recommendation interface for display on the user device, the recommendation interface comprising the one or more additional controls; and electronically receiving, via the established communication link, a user selection of at least one of the one or more additional controls;

wherein the one or more additional controls are incorporated in response to receiving the user selection.

14. The method of claim 8, wherein the one or more additional controls are automatically incorporated in response to determining that the cost associated with the incorporation of each of the one or more additional controls is lower than a difference between the exposure score associated with the at least one of the one or more threat vectors before implementation of the one or more additional controls and after the implementation of the one or more additional controls.

15. A computer program product for identifying threat vectors and implementing controls for securing internal technology resources within a network, the computer program product embodied on a non-transitory computer-readable medium comprising code configured to cause a first apparatus to:
provide a threat vector analysis application for installation on a user device associated with a user;
electronically receive an analysis request associated with an internal resource from the user device, wherein receiving further comprises initiating the threat vector analysis application on the user device, whereby the initiating of the threat vector analysis application establishes a communicable link with a network associated with the internal resource;
electronically receive, via a distributed network of servers, information associated with the internal resource within the network;
determine one or more threat vectors associated with the internal resource, wherein the one or more threat vectors indicate one or more paths of access to the internal resource;
determine one or more controls associated with each of the one or more threat vectors associated with the internal resource, wherein the one or more controls are configured to determine access to the internal resource;
dynamically generate a graphical representation of the internal resource and the one or more threat vectors based on at least the received analysis request; and
initiate, via the established communicable link, a presentation of a user interface for display on the user device, the user interface comprising the graphical representation of the internal resource and the one or more threat vectors associated with the internal resource;
determine a frequency score associated with each of the one or more threat vectors, wherein the frequency score indicates a number of occurrence of a threat via each of the one or more threat vectors;
determine a magnitude of impact score associated with each of the one or more threat vectors, wherein the magnitude of impact score indicates a consequence of a loss event caused via each of the one or more threat vectors;
determine a strength associated with each of the one or more controls associated with each of the one or more threat vectors;
determine an exposure score associated with each of the one or more threat vectors based on at least the frequency score, the magnitude of impact score, and the strength associated with each of the one or more controls associated with each of the one or more threat vectors;
determine one or more additional controls;
determine a cost associated with the incorporation of each of the one or more additional controls;
determine that the cost associated with the incorporation of each of the one or more additional controls is lower than a difference between the exposure score associated with the at least one of the one or more threat vectors before implementation of the one or more additional controls and after the implementation of the one or more additional controls; and
based on determining that the cost associated with the incorporation of each of the one or more additional controls is lower than a difference between the exposure score associated with the at least one of the one or more threat vectors before implementation of the one or more additional controls and after the implementation of the one or more additional controls, incorporate the one or more additional controls.

16. The computer program product of claim 15, wherein the non-transitory computer-readable medium comprises code configured to cause the first apparatus to:
determine that the one or more controls associated with at least one of the one or more threat vectors is not capable of detecting the access to the internal resource;
determine one or more additional controls configured for detecting the access to the internal resource, wherein the one or more controls are stored in a controls library;
initiate, via the established communicable link, a recommendation interface for display on the user device, the recommendation interface comprising the one or more additional controls recommended to the user for incorporation.

17. The computer program product of claim 15, wherein the non-transitory computer-readable medium comprises code configured to cause the first apparatus to:
determine one or more access types associated with each of the one or more threat vectors, wherein the one or more access types indicate one or more ways in which the internal resource is capable of being accessed via each of the one or more threat vectors.

18. The computer program product of claim 15, wherein the non-transitory computer-readable medium comprises code configured to cause the first apparatus to:
determine that the exposure score associated with at least one of the one or more threat vectors is greater than a predetermined threshold;
initiate, via the established communicable link, a recommendation interface for display on the user device, the recommendation interface comprising the one or more additional controls recommended to the user for incorporation; and
electronically receive, via the established communication link, a user selection of at least one of the one or more additional controls recommended to the user;
wherein incorporating the one or more additional controls lowers the exposure.

19. The computer program product of claim 15, wherein the non-transitory computer-readable medium comprises code configured to cause the first apparatus to:
based on determining that the cost associated with the incorporation of each of the one or more additional controls is lower than a difference between the exposure score associated with the at least one of the one or more threat vectors before implementation of the one or more additional controls and after the implementation of the one or more additional controls, initiate, via the established communicable link, a recommendation interface for display on the user device, the recommendation interface comprising the one or more additional controls; and
electronically receive, via the established communication link, a user selection of at least one of the one or more additional controls;
wherein the one or more additional controls are incorporated in response to receiving the user selection.

20. The computer program product of claim 15, wherein the one or more additional controls are automatically incorporated in response to determining that the cost associated with the incorporation of each of the one or more additional controls is lower than a difference between the exposure score associated with the at least one of the one or more threat vectors before implementation of the one or more additional controls and after the implementation of the one or more additional controls.

* * * * *